Aug. 24, 1937.          H. C. MYERS          2,090,874
TRAILER
Filed April 3, 1937
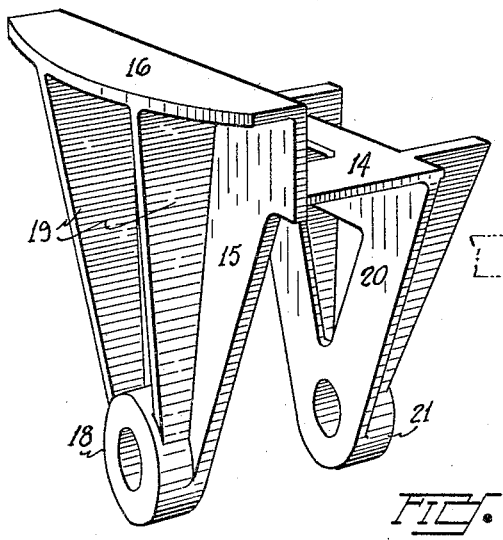
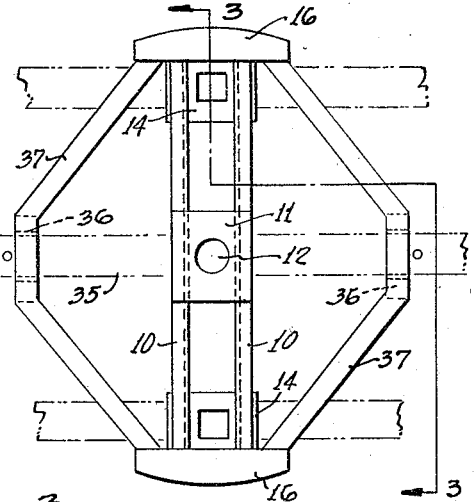
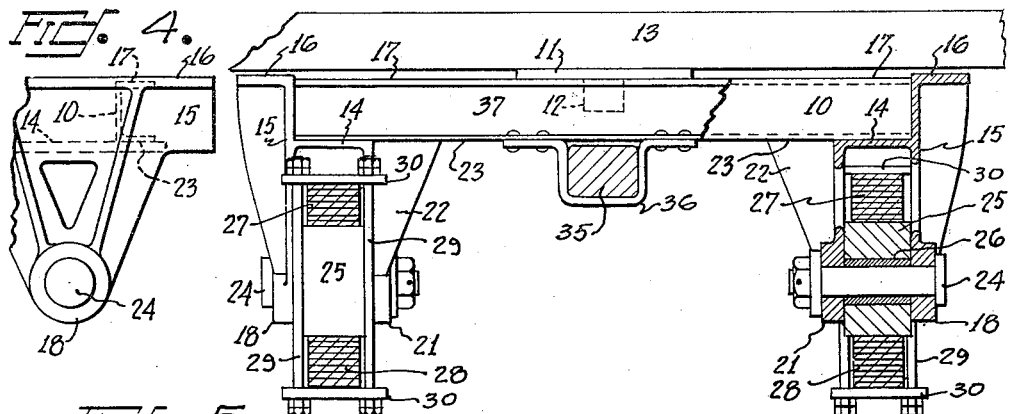
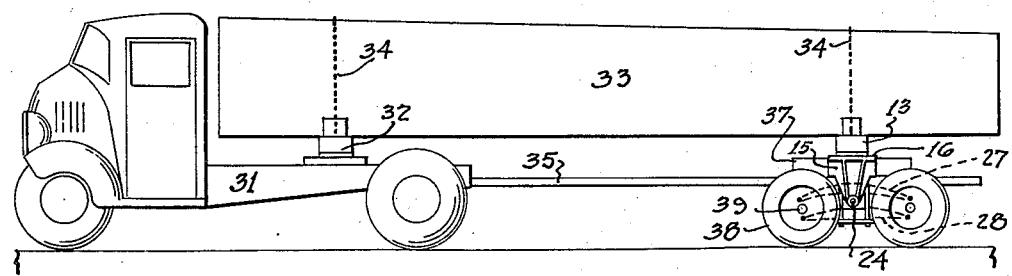
INVENTOR.
H. C. MYERS
BY
ATTORNEY.

Patented Aug. 24, 1937

2,090,874

UNITED STATES PATENT OFFICE 2,090,874

TRAILER

Henry Clay Myers, Tillamook, Oreg.

Application April 3, 1937, Serial No. 134,780

4 Claims. (Cl. 280—80)

This invention relates generally to the automotive industry, and particularly to a trailer of the dual axle type in which the springs are adapted to rock on a center shaft.

The main object of this invention is the development of an improved form of trailer in which the spring pivots are supported at both ends and in which the major portion of the pivot shaft is eliminated.

The second object is the development of a trailer of the class described which will be relatively light in weight for a given load carrying capacity.

The third object is the development of a trailer of the class described which will be easy to construct and maintain and which will facilitate the removal of and replacement of springs.

The fourth object is to develop a trailer especially adapted for logging purposes in which the distance between the rub plates is as great as possible thereby increasing the lateral stability of the trailer.

The fifth object is a trailer of the class described which can be used on any type of dual axle trailer in which the springs are made to pivot on a center shaft.

The sixth object is to reduce the number of castings required in the construction of such devices.

The seventh object is to construct a trailer of the class described in which the load is carried directly over the springs instead of being transferred thereto by a twisting action.

These, and other objects, will become more apparent from the specification following as illustrated in the accompanying drawing, in which:

Fig. 1 is a perspective view of a trailer fork.

Fig. 2 is a plan of a trailer.

Fig. 3 is a vertical section taken along the line 3—3 in Fig. 2.

Fig. 4 is a fragmentary end elevation of Fig. 3.

Fig. 5 is a side elevation of a logging truck with a trailer attached thereto and with the load in position.

Similar numerals of reference refer to similar parts throughout the several views.

Referring in detail to the drawing, there is shown a pair of transverse channel members 10 across whose intermediate portions is secured a plate 11 through which extends the king pin 12 of the bunk 13. Across the under side of the outer ends of the members 10 is secured the head 14 of a forked spring frame whose outer side 15 extends upwardly and is then flanged outwardly to form a rub plate 16 whose top surface is slightly above the top surfaces 17 of the members 10. Since the rub plates 16 are outturned they increase the width of the base upon which the bunk 13 is supported.

At the lower end of the side 15 is formed the outer housing 18. Upright ribs 19 are placed between the rub plates 16 and the housing 18. Depending from the head 14 is the inner forked side 20 on whose lower end is formed the inner housing 21. Upwardly extending ribs 22 integral with the member 20 are attached to the under side 23 of the members 10.

Supported by the housings 18 and 21 is a pivot bolt 24 which passes through the spring center block 25 which is preferably provided with a bushing 26. The springs 27 and 28 are clamped to the spring center block 25 by means of clamping bolts 29 which pass through the clamping plates 30.

For the purpose of illustration there is shown a truck 31 provided with a bunk 32. When the trailer is used for logging, the load of logs 33 is held upon the bunks 13 and 32 by means of the chains 34. A reach 35 connects the truck 31 to the trailer by means of the reach strap 36 which is secured to the under side of the brace members 37 which connect diagonally to the outer forked portions 15 and cross the reach 35 perpendicularly. The trailer wheels 38 are mounted on suitable axles 39 which are connected to the springs 27 and 28 in the customary manner.

It can be seen from the foregoing that the construction described herein will provide the maximum amount of rigidity to the trailer with a minimum amount of weight and number of parts. It will also be seen that should it be necessary to replace a spring this operation is facilitated by the fact that instead of using the long center shaft only short bolts 24 are employed. In some instances it is desirable to employ a tubular shaft instead of the bolt 24 and to mount same in a bronze bushing 26.

It is desirable of course to keep the diameter of the pivot bolt 24 fairly large in order to provide the proper bearing area. It may also be seen that instead of welding a fork, illustrated in Fig. 1, at each end of the cross members 10, they may be bolted or riveted together without departing from the spirit of this invention.

I claim:

1. In a trailer the combination of a cross member adapted to be connected to a reach, a downturned extending forked frame at each end of said cross member, the outer side of each frame extending above the top of said cross member to form rub plates and wheel uniting springs rotatably mounted between the forked ends of said frame.

2. A spring mounting for a dual axle trailer consisting of a forked arm having a head connecting the upper ends of the fork and having a cross member attached to said head, the outer side of said fork extending upwardly beyond the top side of said cross member, said outer side having the top end outturned to form a rubbing plate, the lower end of said fork having a spring pivotally mounted therein between its ends and means for mounting a road engaging wheel at each end of said spring.

3. In a device of the class described, a pair of downturned fork members having a horizontal connecting bar between the upper ends thereof, means for attaching a reach to said bar, rubbing plates forming extensions of the outer sides of said forks projecting upwardly and outwardly from the ends of said bar and means for pivotally mounting a pair of dual axles on the lower ends of said forks.

4. In a trailer the combination of a cross member adapted to be connected to a reach, an integral downturned forked frame at each end of said cross member, the outer side of each frame extending above the top of the cross member to form rub plates, a bolster pivotally mounted on said cross frame and supported by said rub plates and spring mounted ground engaging elements connected to said forked members.

HENRY CLAY MYERS.